United States Patent
Nostro et al.

(10) Patent No.: US 11,277,888 B2
(45) Date of Patent: Mar. 15, 2022

(54) COOKING HOB

(71) Applicant: ELECTROLUX APPLIANCES AKTIEBOLAG, Stockholm (SE)

(72) Inventors: Massimo Nostro, Forli (IT); Alex Viroli, Forli (IT); Filippo Martini, Forli (IT); Filippo Milanesi, Forli (IT); Fabio Angeli, Forli (IT); Laurent Jeanneteau, Compiègne (FR)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 17/256,299

(22) PCT Filed: Jun. 13, 2019

(86) PCT No.: PCT/EP2019/065506
§ 371 (c)(1),
(2) Date: Dec. 28, 2020

(87) PCT Pub. No.: WO2020/007586
PCT Pub. Date: Jan. 9, 2020

(65) Prior Publication Data
US 2021/0259069 A1    Aug. 19, 2021

(30) Foreign Application Priority Data
Jul. 1, 2018    (EP) ..................... 18181053

(51) Int. Cl.
*H05B 6/12* (2006.01)
*H05B 6/06* (2006.01)

(52) U.S. Cl.
CPC ........... *H05B 6/1272* (2013.01); *H05B 6/065* (2013.01); *H05B 2213/05* (2013.01)

(58) Field of Classification Search
CPC .. H05B 6/1272; H05B 6/065; H05B 2213/05; H05B 2213/03; H05B 2206/022; Y02B 40/00; Y02B 40/126
(Continued)

(56) References Cited

U.S. PATENT DOCUMENTS

2011/0017723 A1* 1/2011 Kleinhans ............... F24C 7/083
                                                              219/492
2011/0240632 A1* 10/2011 Anton Falcon .......... H05B 6/04
                                                              219/601
(Continued)

FOREIGN PATENT DOCUMENTS

EP    0498735    8/1992
EP    0716560    6/1996
(Continued)

OTHER PUBLICATIONS

International Search Report and Written Opinion for PCT/EP2019/065506, dated Sep. 12, 2019, 8 pages.

*Primary Examiner* — Quang T Van
(74) *Attorney, Agent, or Firm* — Pearne & Gordon LLP (57) ABSTRACT

A cooking hob includes at least one heating power transferring element with multiple concentrically arranged windings, one or more heating power energy units for powering the windings, a control unit that controls the heating power energy units, and detection means that determines the coverage of the windings by a cookware item. The control unit balances the heat provided to the cookware item by determining a rescaled electric power for the windings based on power requests and information regarding the coverage of the windings and establishes an operating cycle by determining a duty cycle for one or more windings. The duty cycle defines the activation time of the respective winding and is chosen such that the mean electric power provided to
(Continued)

the respective winding within the operating cycle is equal or essentially equal to the rescaled electric power associated with the winding.

14 Claims, 3 Drawing Sheets

(58) Field of Classification Search
USPC ....... 219/601, 620, 621, 622, 624, 625, 626,
219/627, 630, 635, 660, 661, 662, 670,
219/671, 672, 447.1, 461.1, 465.1,
219/448.11, 448.14, 4, 48.16, 448.19,
219/492, 578
See application file for complete search history.

(56) References Cited

U.S. PATENT DOCUMENTS

| | | | |
|---|---|---|---|
| 2019/0029081 A1* | 1/2019 | Nam | H05B 6/065 |
| 2019/0327792 A1* | 10/2019 | Baldo | H05B 6/062 |
| 2019/0357320 A1* | 11/2019 | Kwack | H05B 6/065 |

FOREIGN PATENT DOCUMENTS

| | | |
|---|---|---|
| EP | 2342943 | 7/2011 |
| WO | 2010084096 | 7/2010 |

* cited by examiner

COOKING HOB

The present invention relates generally to the field of cooking hobs. More specifically, the present invention relates to a cooking hob, preferably an induction hob comprising software-controlled heat distribution balancing means and acoustic noise suppression means.

BACKGROUND OF THE INVENTION

Induction heating appliances, per se, are known in prior art.

In order to avoid acoustic noise due to interferences between different coils or windings, European patent application EP 0 716 560 A1 suggests a frequency and phase synchronization.

SUMMARY OF THE INVENTION

It is an objective of the embodiments of the present invention to provide a cooking hob with one or more heating power transferring elements comprising multiple concentrically arranged windings which provides an improved heat distribution over the cookware item cross-section paired with acoustic noise suppression. The objective is solved by the features of the independent claims. Preferred embodiments are given in the dependent claims. If not explicitly indicated otherwise, embodiments of the invention can be freely combined with each other.

It is known in the art that such household cooking hobs usually are provided for conducting at least one cooking process comprising heating and/or cooling step, respectively. Such cooking process preferably at least comprises a heating step, e.g. frying, boiling, simmering or pouching of a foodstuff or a cooking liquid, respectively. For supporting the foodstuff or cookware item, it is particularly known to provide a cooking support, for example in the form of a cooking surface. Such cooking surface usually provides a support for the cookware items, for example, provided in the form of a plate element, particularly a glass or glass ceramic plate.

Preferably, the cooking hob comprises, preferably consists of, a cooking support and a lower casing. Thereby it is preferred that an open top side of the lower casing is covered by at least a part of the cooking support. The cooking support may be provided particularly as at least one panel, wherein preferably the panel is a glass ceramic panel. Preferably, at least one or more heating power transferring elements are arranged beneath the panel.

The lower casing may be manufactured from different material comprising plastics or metal, e.g. aluminum.

In particular, such casing may include a bottom wall and at least one sidewall. It is preferred that said casing is made of metal, e.g. aluminium or steel, and/or plastics, wherein preferably the casing made of metal is grounded.

Advantageously said lower casing may comprise at least one heating power energy unit, particularly arranged in a respective heating power energy unit housing, the heating power transferring elements, heating power transferring element carrier or heating power transferring element support. In other words, the lower casing and the cooking support may form a closed unit comprising all essential parts of the cooking hob. Thereby the lower casing may comprise fastening means for fastening and/or arranging the cooking hob on top of or in a cutout of a work plate.

Thereby, preferably, a power-transferring element may be arranged below a cooking support. Preferably, the one or more heating power transferring elements are arranged in an upper portion of the lower casing of the cooking hob. A power transferring element may be arranged and supported by one or more heating power transferring element carrier or heating power transferring element support, preferably the power transferring element attached and/or arranged on said carrier or support. A housing comprising an energy power unit may be arranged below one or more heating power transferring element carrier or heating power transferring element supports. Thereby, preferably a heating power transferring element carrier or heating power transferring element support with the supported heating power-transferring element may advantageously be arranged on top of and/or attached to such housing of an energy power unit.

For conducting the cooking process, particularly a heating step, a cooking appliance, particularly the lower casing, comprises at least one heating power-transferring element. Said heating power-transferring element is provided for transferring heating power to the foodstuff or cooking liquid, preferably contained in a cookware item.

Preferably, the at least one heating power transferring element is an electric heating element, in particular an induction heating element, particularly induction coil, and/or radiant heating element. The heating power provided by a heating power-transferring element may be preferably provided electrically. Preferably, the heating power may be provided by a heat-generating magnetic field, more particularly an induction field. Accordingly, the cooking hob of the present invention preferably is an induction hob.

Preferably, a heating power-transferring element in the form of an induction coil comprises a planar conductive winding wire, particularly a copper wire. Preferably, an induction coil comprises at least one magnetic field supporting element, e.g. a ferrite element. Preferably, said at least one magnetic field supporting element, particularly at least one ferrite element, is arranged below the plane of the conductive winding wire. Said at least one magnetic field supporting element, particularly ferrite element, is advantageous in establishing and/or supporting the high frequent alternating magnetic field of the induction coil. Said magnetic field supporting element, particularly if arranged below the conductive winding wire, may be glued to or supported by ferrite support elements, e.g. snap fit connectors or the like.

Preferably, an induction coil comprises a shielding element, e.g. a mica sheet. The shielding element preferably is adapted to the form of the planar conductive winding wire or the form of at least two planar conductive winding wires of at least two adjacently arranged coils. The shielding element preferably is provided above the at least one magnetic field supporting element, particularly at least one ferrite element. The shielding element preferably in its main function is a support for the planar conductive wire windings of the coil. However, additionally the shielding element, particularly mica sheet, may also shield temperature radiated from the above, e.g. resulting from a heated up pot bottom.

In the cooking hob of the present invention the at least one heating power transferring element is preferably arranged and/or mounted on a heating power transferring element carrier or heating power transferring element support, particularly comprised in the lower casing. It is particularly preferred that a carrier made of aluminum sheet metal supports the heating power-transferring element. Particularly, the cooking hob of the present invention may comprise power transferring element carrier or heating power transferring element support to support one heating power transferring element, however, it is also considered herein that one power transferring element carrier or heating power transferring element support is provided to support more than one heating power transferring element.

In a preferred embodiment of the present invention, two heating power-transferring elements are arranged on and supported by one common heating power transferring element carrier. Particularly at least two induction coils are arranged on and supported by one common induction coil carrier plate.

The heating power transferring element carrier or heating power transferring element support may be advantageously supported by or on a housing of the heating energy power unit.

Particularly, at least one of, preferably all of, the heating power transferring elements of an cooking hob of the invention, more particularly an induction coil of an induction hob, may be arranged below a cooking support, particularly a cooking surface in form of a plate element, and particularly within the lower casing, in order to provide the heat for a heating step to a heating zone of the cooking support and to the bottom side of a cookware item and foodstuff, respectively, when placed on said heating zone.

A cooking support of a cooking hob of the invention, particularly of an induction hob of the invention, preferably comprises at least one heating zone. Such heating zone as referred to herein, preferably refers to a portion of the cooking support, particularly cooking surface, which is associated with one heating power transferring element, e.g. a radiant heating element or an induction coil, which is arranged at, preferably below, the cooking support, e.g. the glass ceramic plate. Particularly, in an embodiment according to which the cooking hob of the present invention is an induction hob, it is preferred that such heating zone refers to a portion of the cooking support, which is associated with at least one induction coil. Thereby, the heating power transferring elements associated with a heating zone are preferably configured such that the same heating power of the associated heating power transferring elements is transferred to the heating zone. Preferably, the heating zone thus refers to a portion of the cooking support to which the same heating power of the associated at least one heating power transferring element is transferred.

In addition, the cooking hob of the present invention, may particularly be configured such that in one operation mode one or more than one heating zones form one cooking zone and/or are combined to one cooking zone, respectively. A cooking zone may be particularly be provided as at least a portion of the cooking surface. Particularly, such cooking zone is associated with at least one heating zone. Additionally, or alternatively, a cooking zone may be associated with more than one heating zone. Particularly, a cooking zone may be associated with an even number, particularly two, four, six, eight or ten, more particularly two, heating zones. Alternatively, a cooking zone may be associated with an uneven number, particularly three, five, seven or nine, more particularly three, heating zones.

Preferably, the cooking hob of the present invention is configured such that a cooking zone comprises one or more than one heating zones, which can be driven with the same or different power, frequency or heating level.

In the present invention, it is preferred that in at least one operation mode of the cooking hob according to the present invention is configured such that a cooking zone comprises at least two, preferably two, heating zones, driven by the same power, frequency or heating level. Particularly, such cooking zone comprises or is associated with at least two, preferably two, heating power-transferring elements.

Additionally, or alternatively, the cooking hob of the present invention may be configured such that the number of heating zones associated with one cooking zone may vary and/or may be adjustable dependent on the needs of the cook and/or the size, form or kind of cookware placed on the cooking surface.

Particularly, a cooking hob according to the present invention, preferably an electric hob, such as an induction hob, may comprise at least one heating power energy unit. A heating power energy unit as used herein, preferably provides energy to at least one of, preferable a number of, the heating power transferring elements such that the heating power transferring element is capable of transferring heating power for heating up the foodstuff or cooking liquid. A heating power energy unit of an induction hob, for example, may provide energy in the form of a high frequency alternating current to a heating power-transferring element in the form of an induction coil, which transfers heating power in the form of a magnetic field to a suitable cookware item. For such purpose, a heating power energy unit may comprise at least one associated power circuit mounted and/or arranged on at least one printed circuit board. Preferably, a heating power energy unit is supported and arranged in a housing, preferably a plastic housing, preferably arrangable in and adapted to the lower casing. This allows easy manufacturing and modularization.

Particularly, the housing may comprise supporting elements for supporting the heating power transferring element carrier or heating power transferring element support. Particularly, such supporting elements may comprise elastic means, e.g. springs or silicon elements, for elastically supporting the heating power transferring element carrier or heating power transferring element support, and particularly advantageous in pressing a heating power-transferring element onto the bottom surface of the cooking support plate, which particularly is a glass ceramic plate.

Particularly, the heating power energy unit, and particularly the associated power circuit, may be configured to be connected to at least one, preferably two phases of a mains supply. A cooking hob according to the present invention thereby comprises at least one, preferably two or three heating power energy units, connected to one or two, preferably one phases of the mains supply each.

Preferably, a heating power energy unit may comprise at least—one associated power circuit, particularly in the form of an at least one heating power generator, for generating heating power and supplying heating power-transferring elements with heating power, particularly for providing heating power to the at least one heating zone. Thereby the power circuit particularly may be provided in the form of a half-bridge configuration or a quasi-resonant configuration.

It will be immediately understood that the heating power energy unit may thus comprise one heating power generator for providing heating power to more than one heating zone, each associated with at least one heating power transferring element.

Furthermore, the heating power energy unit may comprise one heating power generator comprising a single or pair of high frequency switching elements.

In particular, the high frequency switching element is provided in the form of a semiconductor-switching element, particularly an IGBT element.

In case the heating power energy unit may comprise one heating power generator comprising a single high frequency switching element, the single switching element preferably forms part of associated power circuit, provided in the form of, or a part of, a Quasi Resonant circuit.

In case that the heating power energy unit may comprise one heating generator comprises a pair of high frequency switching elements, said pair of high frequency switching elements preferably forms part of an associated power circuit, provided in the form of, or a part of, a half-bridge circuit.

A person skilled in the art will immediately understand that the heat, generated by and/or radiated from particularly the heating power transferring elements, the heating power energy unit and/or the cookware item, particularly the bottom thereof, may have also disadvantageous effects, particularly regarding safety and proper functioning. Particularly, the heating power energy unit, more particularly power circuits comprising switching elements, may generate a significant amount of heat being disadvantage for the safety and proper functioning of the cooking hob. For this reason, the cooking hob comprises at least one cooling means. Particularly, said cooling means is adapted for cooling down the electric and/or electronic elements. Particularly, the heating power energy unit may comprise such cooling means. Such cooling means may comprise at least one of a fan, a cooling channel, a cooling body, preferably from a metal, particularly aluminium, cooling air-guiding means, cooling air deflection means and the like. Particularly, the cooking hob of the present invention may comprise such cooling means for cooling at least one heating power generator or a part thereof, particularly to at least one single or pair of high frequency switching elements. More particularly, such cooling means may comprise a cooling body, preferably arranged in the air path of a cooling fan, and thermally connected to at least one heating power generator or a part thereof, particularly to at least one single or pair of high frequency switching elements. Thereby it is preferred that the cooling means comprises at least one fan for generating an air stream through the cooling channel. Preferably, the cooling channel and/or cooling body extends horizontally through the cooking hob. For example, the cooling channel and/or cooling body extends over a substantial part of the horizontal width of the cooking hob.

The cooking hob according to the present invention preferably further comprises a control unit. Such control unit is preferably operatively connected with the heating power energy unit to control at least one operational parameter of the cooking hob, particularly an operational parameter of the heating power energy unit. Furthermore, the control unit comprises a user interface at least for receiving a command input of a user. This advantageously allows the user to control at least one operational parameter of the cooking hob, particularly an operational parameter of the heating power energy unit. Moreover, the control unit, and particularly a user interface if present, may be operatively connected to other appliances or interfaces, e.g. a suction hood, a voice control device, a server, a remote interface, a cloud-computing source or the like.

Accordingly, the household cooking hob according to the present invention comprises at least one electric and/or electronic element. Particularly, said at least one electric and/or electronic element comprises a heating power energy unit and/or control unit or parts thereof.

Particularly, the at least one electric and/or electronic element of the household cooking hob of the present invention may be part of an at least one heating energy power unit, preferably mounted and/or arranged on a power board and/or a power generating circuit mounted on a printed circuit board (PCB).

Such at least one electric and/or electronic element may be, for example, selected from the group comprising a heating power generator, filter coils, EMC filters, rectifier, switching elements, like IGBTs, relays, or the like.

According to an aspect, the invention refers to a cooking hob. The cooking hob comprises at least one heating power transferring element including multiple concentrically arranged windings, one or more heating power energy units for powering said windings of the heating power transferring element and a control unit configured to control said one or more heating power energy units. The cooking hob further comprises detection means configured to determine the coverage of the windings of the heating power transferring element by a cookware item. Said detection means may, for example, evaluate the electric power consumed by one or more windings in order to determine the coverage of said one or more windings. Also other methods for coverage evaluation may be possible. The control unit is configured to balance the heat provided to the cookware item by determining a rescaled electric power for the windings of the heating power transferring element based on power requests and information regarding the coverage of the windings and to establish an operating cycle by determining a duty cycle for one or more windings of the heating power transferring element, said duty cycle defining the activation time of the respective winding. The duty cycle is chosen such that the mean electric power provided to the respective winding within the operating cycle is equal or essentially equal to the rescaled electric power associated with said winding.

Said cooking hob is advantageous because heat balancing at the cookware item is obtained by rescaling the electric power provided to the windings and noise reduction is obtained by defining a duty cycle and powering the winding of the heating power transferring element according to said duty cycle.

According to an embodiment, the cooking hob comprises a storage including power scale information. Said power scale information indicates a fraction of power provided to the respective winding depending on a certain operating scenario. Preferably, different power scale information may be provided to the respective windings of the heating power transferring element. For example, the power scale information associated with an outer winding may be greater than power scale information of an inner winding which is surrounded by said outer winding. Based on said power scale information it is possible to adapt the power requests into rescaled electric power values, e.g. by multiplying the power request associated with a winding with the respective power scale information.

According to an embodiment, the operating scenario is associated with coverage information indicating the coverage of the windings of a heating power transferring element. So, in other words, the power scale information corresponding to a certain winding (e.g. the innermost winding) and associated with a first coverage scenario in which all windings are covered may be different to a power scale information associated with the same winding and associated with a coverage scenario in which only some windings are covered and others are uncovered. Thereby, the rescaling of electric power can be adapted to the respective cooking scenario.

According to an embodiment, the control unit is configured to add/sum-up the power requests associated with all windings of a certain heating power transferring element in order to obtain total requested power and distribute said total requested power among the windings according to said power scale information. Thereby, the requested power is provided as an overall power by all active windings but the single power provided to a respective winding may be decreased/increased in order to achieve heat balancing.

According to an embodiment, the windings of the heating power transferring element are powered by an AC current having the same or essentially the same frequency (also referred to as isofrequenciality). Thereby interferences caused by frequency differences which are in the audible range can be reduced or avoided.

According to an embodiment, the cooking hob comprises means for evaluating the inductive coupling between a cookware item and one or more windings of the heating power transferring element. Said means for evaluating the inductive coupling may be power measurement means which are configured to determine the active power (real part of power) provided to a certain winding. Thereby a bad coupling between a winding and a cookware item can be detected.

According to an embodiment, the cooking hob comprises assessment means adapted to establish information regarding the power decrease caused by a poorly-coupled winding and adapted to compare said information regarding the power decrease with a threshold value in order to exclude said poorly-coupled winding. Thereby, a poorly-coupled winding which deteriorates the power transfer of the whole heating power transferring element (due to the isofrequenciality) can be excluded in order to be able to operate the other windings at a more effective operating point.

According to a further aspect, the invention relates to a method for controlling a cooking hob. The cooking hob comprises at least one heating power transferring element comprising multiple concentrically arranged windings, one or more heating power energy units powering said windings of the heating power transferring element and a control unit for controlling said one or more heating power energy units. The method comprises the steps of:

determining the coverage of the windings of the heating power transferring element by a cookware item;

determining a rescaled electric power for the windings of the heating power transferring element based on power requests and information regarding the coverage of the windings, thereby balancing the heat provided by the windings to the cookware item;

establishing an operating cycle by determining a duty cycle for one or more windings of the heating power transferring element, said duty cycle defining the activation time of the respective winding, wherein the duty cycle is chosen such that the mean electric power provided to the respective winding within the operating cycle is equal or essentially equal to the rescaled electric power associated with said winding.

Said method is advantageous because, by rescaling the electric power provided to the windings, a balancing of heat provided to the cookware item is obtained. In addition, noise reduction is obtained by defining a duty cycle and powering the windings of the heating power transferring element according to said duty cycle.

According to an embodiment, the windings of the heating power transferring element are powered by an AC current having the same or essentially the same frequency. Thereby interferences caused by frequency differences which are in the audible range can be reduced or avoided.

According to an embodiment, the operating cycle is segmented in multiple time slots and the length of a first time slot of the operating circle is determined such that the rescaled electric power associated with at least one winding is obtained based on the electric power provided to said winding in the first time slot multiplied by the quotient of durations of first time slot and operating cycle. So, in other words, at least one winding can be deactivated after the first time slot and the electric power provided to said at least one winding is increased such that—as a mean value over all time slots of the operating cycle—the rescaled electric power is provided by said winding in said first time slot.

According to an embodiment, at the beginning of the operation cycle, the number of activated windings is greatest and decreases in subsequent time slots. Preferably, at least one winding is deactivated per time slot transition. Thereby, different power requests for the windings can be implemented using multiple time slots in which different numbers of windings are active.

According to an embodiment, all windings which are active in a certain time slot are powered by the same electric power value. Thereby, the frequency of AC-current provided through the windings can be chosen equal or essentially equal, which leads to a reduction of acoustic noise.

According to an embodiment, a total electric power value is established and electric power according to said total electric power value is distributed among the active windings. Said total electric power value may refer to a certain time slot and may indicate the amount of electric power which is provided in said time slot by all active windings. Thereby it is possible to provide a distribution of total requested power over said time slots.

According to an embodiment, windings with the same rescaled electric power are powered simultaneously and with the same duration in the operating cycle. Due to the provision of same electric power to all active windings in a certain time slot, windings which are associated with the same rescaled electric power are driven simultaneously for the same number of time slots.

According to an embodiment, the operating cycle is segmented in multiple time slots, wherein the number of time slots included in one operating cycle corresponds to the number of different rescaled electric power values associated with said windings. Thereby, each rescaled electric power value associated with one or more windings can be reached by a set of time slots in which said rescaled electric power is provided to said one or more windings.

According to an embodiment, the inductive coupling between the cookware item and the winding is evaluated and a winding is deactivated if the power decrease caused by a poor coupling is above a certain threshold value. Thereby a poorly-coupled winding which deteriorates the power transfer of the whole heating power transferring element (due to the isofrequenciality) can be excluded in order to enable an operation of the other windings at a more effective operating point.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present invention disclosed in the specification, the claims, examples and/or the figures may both separately and in any combination thereof be material for realizing the invention in various forms thereof.

Figure 1:
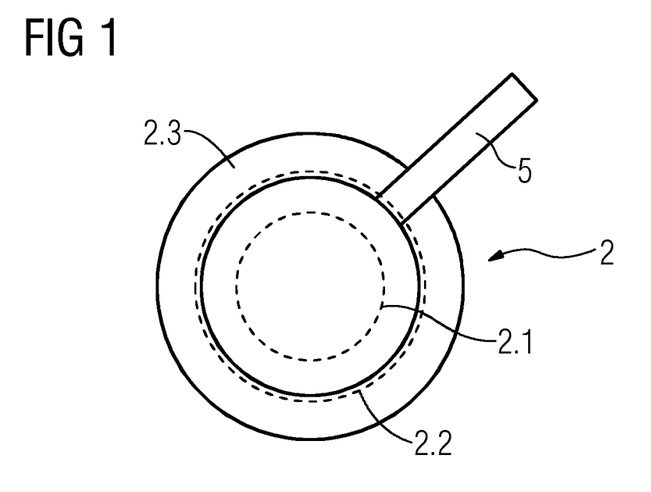
FIG. 1 shows an example top view of cookware item placed above a heating power transferring element comprising multiple concentrically arranged windings.

FIG. 1 illustrates a heating power transferring element 2 which is partly covered by a cookware item 5 placed above the heating power transferring element 2. The heating power transferring element 2 may be, for example, an induction coil of a cooking hob, specifically an induction hob.

The heating power transferring element 2 comprises multiple windings 2.1-2.n. Said windings 2.1-2.n are concentrically arranged, i.e. a first winding 2.1 forms an inner winding which is circumferentially surrounded by one or more further windings 2.2-2.n. Such arrangement of windings 2.1-2.n is advantageous because by activating only some of the inner windings, a cookware item with a small-sized base area can be heated, whereas powering all windings 2.1-2.n allows for a heating of cookware items with a large-sized base area.

Figure 2:
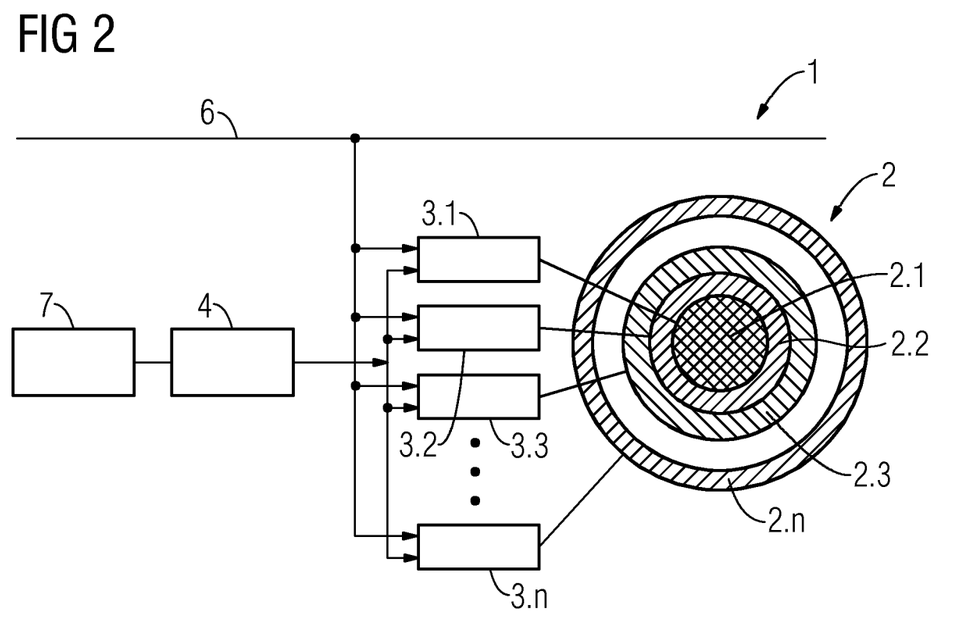
FIG. 2 shows an example schematic diagram of a cooking hob.

FIG. 2 shows a schematic diagram of a cooking hob 1 including a heating power transferring element 2 similar to the one shown in FIG. 1.

The cooking hob 1 comprises multiple heating power energy units 3.1-3.n. Each heating power energy unit 3.1-3.n may be coupled with one of the windings 2.1-2.n in order to provide electric power to said winding 2.1-2.n. As shown in FIG. 2, the heating power energy units 3.1-3.n are connected to a line 6 via which rectified mains voltage may be provided to the heating power energy units 3.1-3.n.

The cooking hob 1 further comprises a control unit 4. Said control unit 4 is coupled with said heating power energy units 3.1-3.n in order to provide control information from the control unit 4 to the heating power energy units 3.1-3.n. Based on said control information, the operation conditions of the winding 2.1-2.n (winding active/inactive, electric power provided through the winding, AC-frequency etc.) are controlled.

The control unit 4 may be coupled with a user interface 7 via which user requests are received.

A heating power transferring element 2 comprising multiple concentrically arranged windings 2.1-2.n may suffer from a nonuniform heat distribution in radial direction, i.e. an inner winding 2.1 may have a higher power density and therefore may provide more heating power to the cookware item 5 than an outer winding 2.2-2.n. In addition, in order to avoid or reduce noise occurring due to a mismatch of operating conditions, the cooking hob 1 performs a power redistribution algorithm which balances the provision of heat to the cookware item 5 and leads to noise reduction due to a noise reduction algorithm.

As an overview, the cooking hob 1 comprises a control unit (which may be a dedicated control unit or a control unit included in the user interface 7 or formed by a controller of a master heating power energy unit). The control unit is configured to collect power requests associated with the concentric windings 2.1-2.n of a single heating power transferring element 2 in order to obtain total requested power and redistribute said total requested power to the windings 2.1-2.n according to power scale information stored in the cooking hob 1. The operation of the cooking hob, specifically of the windings 2.1-2.n is performed according to an operation cycle including multiple time slots. The electric power provided to the respective winding 2.1-2.n and the duty cycle associated with said winding 2.1 is chosen such that the mean electric power provided to the respective winding within an operation cycle is equal or essentially equal to the requested power.

In the following, the power redistribution algorithm is described in closer detail. The control unit 4 may have access to a storage in which power scale information is stored. The power scale information may determine which portion of total requested power should be provided to a certain winding 2.1-2.n of a heating power transferring element 2. The power scale information associated with a certain winding 2.1-2.n may be different for various coverage scenarios of the heating power transferring element 2. In case that all windings 2.1-2.n of the heating power transferring element 2 are covered, the portion of total requested power provided to a certain covered winding may be smaller than in case of covering only some inner windings.

The following table shows example power scale information associated with a heating power transferring element 2 comprising three windings 2.1-2.3 for different coverage conditions.

| Windings coverage | Power scale factor winding 2.1 | Power scale factor winding 2.2 | Power scale factor winding 2.3 |
| --- | --- | --- | --- |
| Windings 2.1-2.3 | 25% | 35% | 40% |
| Windings 2.1-2.2 (2.3 not active) | 40% | 60% | 0% |
| Windings 2.1 (2.2 and 2.3 not active) | 100% | 0% | 0% |
| No winding active | 0% | 0% | 0% |

Based on upper-mentioned table including power scale information, an example of power rescaling is provided. According to the example, all three windings 2.1-2.3 may be covered. The user may provide a power request of 500 W per each winding 2.1-2.3. Therefore, the total requested power of the heating power transferring element 2 is 1500 W.

In order to balance the heating power over the cross-sectional area of the cookware item 5, the total requested power (e.g. 1500 W according to the present example) is multiplied with the power scale information associated with the respective winding 2.1-2.3 thereby obtaining a rescaled electric power associated with each winding 2.1-2.3.

In the present example of total requested power of 1500 W and a coverage of all windings 2.1-2.3, the inner winding 2.1 may be powered with 375 W, the middle winding 2.2 may be powered with 525 W and the outer winding 2.3 may be powered with 600 W.

According to a second example, only windings 2.1 and 2.2 may be covered and the power request per each winding may be 500 W. Thus, the total requested power is 1000 W.

According to the second example, the inner winding 2.1 may be powered with 400 W, the middle winding 2.2 may be powered with 600 W and the outer winding 2.3 is deactivated, i.e. no electric power is provided to the outer winding 2.3.

Thereby, a higher uniformity of heat distribution over the cross-section of the cookware item is obtained.

In the following, the power distribution over an operating cycle is explained which leads to a mean value of electric power provided to a respective winding which coincides with the rescaled electric power obtained by upper-mentioned power redistribution algorithm. The operating cycle may be a repetitive time frame which may have a duration in the range of 1 sec to 20 sec, preferably, 3 sec to 10 sec, specifically 4 sec, 5 sec, 6 sec, 7 sec, 8 sec or 9 sec. Also other durations may be possible. The operating cycle may be segmented into multiple time slots.

According to one aspect, acoustic noise interferences are avoided by using equal or essentially equal AC-frequencies for all active windings 2.1-2.n. So, in other words, the electric current provided to the active windings 2.1-2.n comprises the same frequency.

In order to power the windings 2.1-2.n with the rescaled electric power without frequency changes, at least some windings 2.1—2.n may not be powered during the whole operating cycle. So, in other words for at least some windings 2.1-2.n, a duty cycle may be defined, said duty cycle indicating, for example, a portion of the operating cycle in which the respective winding 2.1-2.n is powered.

In the following, a method for determining a duty cycle for at least some windings 2.1-2.n is explained in closer detail.

In a first step, the number of time slots is determined, based on which the operating cycle is segmented.

The number of time slots $N_{Slots}$ may be chosen equal to the number of different power requests $N_{PowerRequest}$, specifically rescaled electric power requests obtained based on upper-mentioned power redistribution algorithm:

$$N_{slots} = N_{PowerRequest}; \quad \text{(formula 1)}$$

The total requested power $Tot_{Pwr}$ is given by the sum of power requests associated with all active windings 2.1-2.n:

$$Tot_{Pwr} = \sum_{i=0}^{N_{Za}} Pwr_{Zi}; \quad \text{(formula 2)}$$

wherein
$N_{Za}$ is the number of active windings (i.e. number of windings for which a power request is received from the user interface); and
$Pwr_{Zi}$ is the power request associated with a certain winding $Z_i$ (e.g. received via the user interface).

The power requested for each winding, specifically the rescaled electric power request, may be sorted into a power array $Sort_{Pwr}$, wherein the requested power values may increase with the length of the array. Windings with the same power request may be only considered once in the array, but a weight array W may be associated with the power array $Sort_{Pwr}$, the entries of the weight array W indicating the number of windings having a power request according to the corresponding position in the power array $Sort_{Pwr}$.

$$Sort_{Pwr} = \{Pwr_{s0}, Pwr_{s1}, Pwr_{s2}, \ldots\}; \quad \text{(formula 3)}$$

wherein
$Pwr_{si}$ indicates a rescaled power request associated with one or more windings and wherein $Pwr_{si+1} > Pwr_{si}$.

As mentioned before, the weight array W may include weighting values $w_1, \ldots, w_n$ indicating the number of windings having a power request according to the corresponding position in the power array $Sort_{Pwr}$:

$$W = \{w_0, w_1, w_2, \ldots\}; \quad \text{(formula 4)}$$

The power provided to each winding 2.1-2.n per time slot and the duty cycle of each time slot (i.e. the share of the time slot with respect to the whole operating cycle) can be calculated as follows:

The number of active windings 2.1-2.n per time slot $ts_i$ is:

$$N_{ts_0} = N_{Za}; \quad \text{(formula 5)}$$

$$N_{ts_i} = N_{ts_{(i-1)}} - W[i-1]; \text{ where } i > 1; \quad \text{(formula 6)}$$

wherein
$N_{ts0}$ is the number of active windings in the first time slot of an operating cycle;
$N_{Za}$ is the number of active windings (i.e. number of windings for which a power request is received from the user interface);
$N_{tsi}$ is the number of active windings in the $i^{th}$ timeslot of an operating cycle; and
W[i] is the weighting value at position i of the weight array.

The average power of each time slot $ts_i$ is given by formulas:

$$P_{ts_0} = Pwr_{s0} \cdot N_{ts_0}; \quad \text{(formula 7)}$$

$$P_{ts_i} = (Pwr_{si} - Pwr_{si-1}) \cdot N_{ts_i}; \text{ where } i > 1; \quad \text{(formula 8)}$$

wherein
$Pwr_{s0}$ is the power value included in the first position of the power array $Sort_{Pwr}$; and
$Pwr_{si}$ is the power value included in the $i^{th}$ position of the power array $Sort_{Pwr}$.

The duty cycle $t_{si\%}$ of time slot $t_{si}$ is given by formula:

$$t_{si\%} = \frac{P_{ts_i}}{Tot_{Pwr}}; \quad \text{(formula 9)}$$

The percentage of total power for each winding in the respective time slot $ts_i$ is given by formula:

$$P_{siZ\%} = \frac{1}{N_{ts_i}}; \quad \text{(formula 10)}$$

In the following, the distribution of power over the active windings within an operating cycle is explained based on examples.

Figure 3:
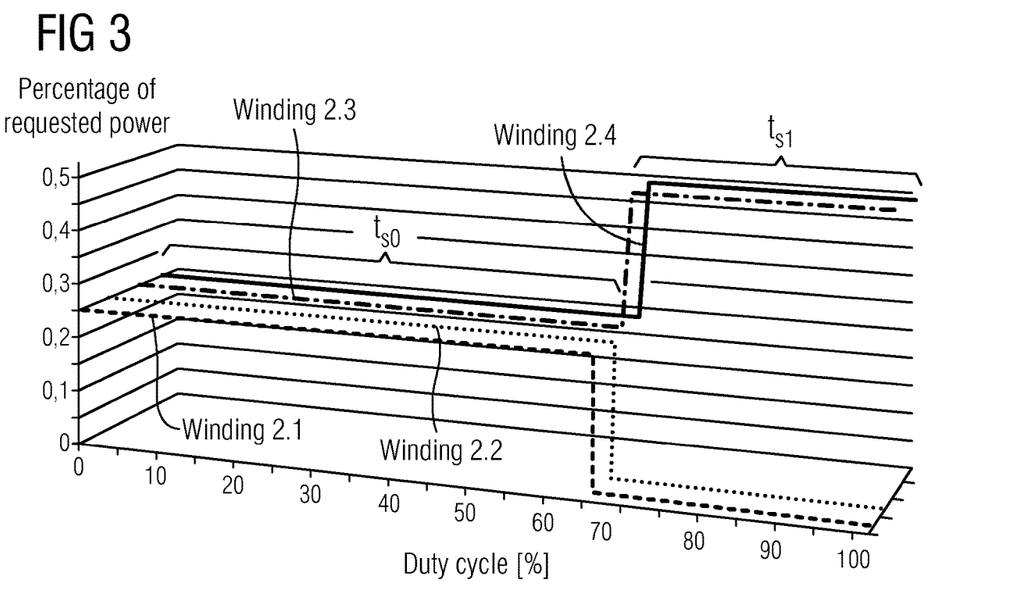
FIG. 3 shows the percentage of total requested power provided to the respective windings in an operation cycle according to a first example power request.
Figure 4:
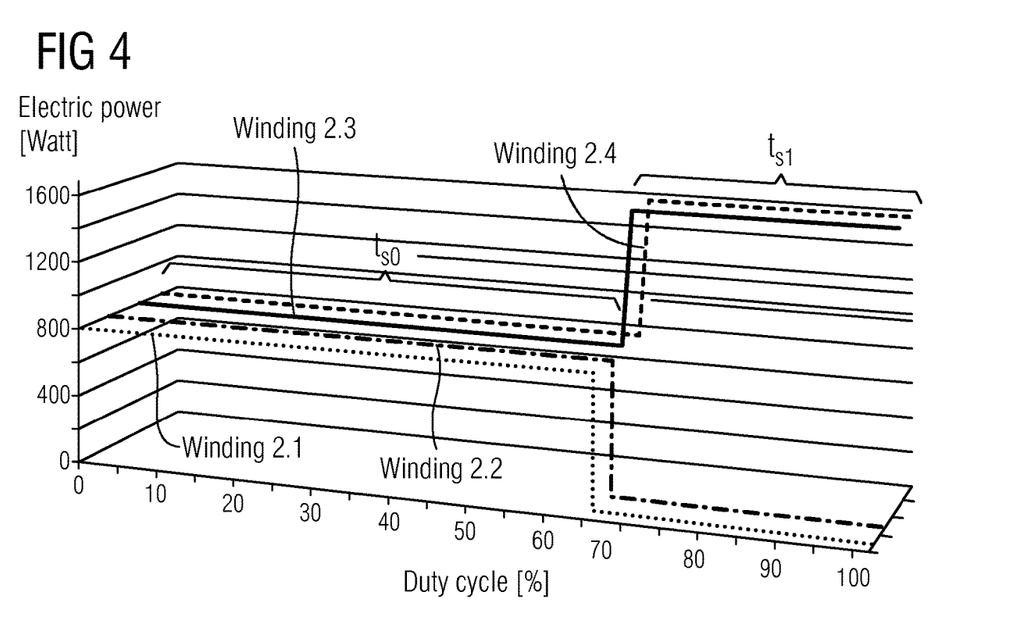
FIG. 4 shows the electric power provided to the respective windings in an operation cycle according to the first example power request.

FIGS. 3 and 4 illustrate diagrams which show the percentage of total requested power $Tot_{Pwr}$ provided to each winding 2.1-2.4 over an operating cycle, in the present example represented as duty cycle.

In a first example, power requests are received for a heating power transferring element 2 comprising four windings 2.1-2.4, wherein the power request for the first winding 2.1 is Z1=500 W, the power request for the second winding 2.2 is Z2=500 W, the power request for the third winding 2.3 is Z3=1000 W and the power request for the fourth winding 2.4 is Z4=1000 W. The power request may be the power request provided by the user via the user interface or, preferably, the rescaled power request obtained by uppermentioned power redistribution algorithm.

Based on formula 1, the number of time slots included in one operating cycle is $N_{Slots}=2$. According to formula 2, the total requested power is $Tot_{Pwr}=3000$ W.

So, in other words, the operating cycle shown in FIGS. 3 and 4 comprises two time slots $t_{s0}$ and $t_{s1}$, wherein the total power of 3000 W has to be distributed over the windings 2.1-2.4 of the heating power transferring element 2 within the operating cycle.

According to formula 3, the power array $Sort_{Pwr}$ includes the following values: $Sort_{Pwr}=\{Pwr_{s0}, Pwr_{s1}\}\{500, 1000\}$.

The weight array W includes, according to formula 4, the values: $W=\{w_0, w_1\}\{2, 2\}$.

According to formula 5, $N_{ts0}=N_{Za}=4$. So, in other words, at the beginning, all windings 2.1-2.4 for which a power request has been received are powered.

According to formula 6, in the second time slot $t_{s1}$, the number of activated windings is reduced as follows:

$$N_{ts1}=N_{ts0}-W[0]=2;$$

So, in other words, in the second time slot $t_{s1}$, the number of activated windings is reduced from four to two (windings 2.1 and 2.2 are deactivated). It is worth mentioning that in the second time slot $t_{s1}$, those windings remain activated for which higher power requests have been received.

Based on formulas 7 and 8, the average power provided to the cookware item in the respective time slot is calculated:

$$P_{ts0=Pwrs0} \cdot N_{ts0}=2000 \text{ W};$$

$$P_{ts1}=(Pwr_{s1}-Pwr_{s0}) \cdot N_{ts1}=(1000 \text{ W}-500 \text{ W}) \cdot N_{ts1}=500 \text{ W} \cdot 2=1000 \text{ W};$$

The length of the time slots $t_{s0}$ and $t_{s1}$ is calculated based on formula 9:

$$t_{s0\%} = \frac{P_{ts0}}{Tot_{Pwr}} = \frac{2000 \text{ W}}{3000 \text{ W}} = 0.\overline{66};$$

$$t_{s1\%} = \frac{P_{ts1}}{Tot_{Pwr}} = \frac{1000 \text{ W}}{3000 \text{ W}} = 0.\overline{33};$$

According to formula 10, the portions of power provided by active windings in the respective time slots $t_{s0}$ and $t_{s1}$ are:

$$P_{s0Z\%} = \frac{1}{N_{ts0}} = \frac{1}{4};$$

$$P_{s1Z\%} = \frac{1}{N_{ts1}} = \frac{1}{2};$$

So, summing up, the total requested power is distributed over the operating cycle which is segmented in multiple time slots wherein the number of time slots is determined based on the number of different power requests or rescaled power requests. In the first time slot, all windings for which power requests have been received are powered by the same electric power value and, at the transition to the next time slot, at least one winding is deactivated. So in other words, the number of active windings decreases within an operating cycle. In addition, also in subsequent time slots, the electric power provided to active windings is equal or essentially equal. Thereby, the windings can be operated with the same AC-frequency and interferences between the windings leading to audible noise can be decreased.

Referring again to FIGS. 3 and 4, the power provided to the windings 2.1 to 2.4 in the first time slot is 750 W per each winding. Due to the duty cycle of 66% of the first and second winding 2.1, 2.2, the mean power provided to the first and second winding 2.1, 2.2 is 500 W, as requested. Similarly, the power provided to the third and fourth winding 2.3, 2.4 in the first time slot is 750 W per each winding and in the second time slot 1500 W. Thus, again taking the duty cycle of the first and second time slot (66%, 33%) into account, the mean power provided to the third and fourth winding 2.3, 2.4 is (750 W*66%)+(1500 W*33%)=1000 W, as requested.

Figure 5:
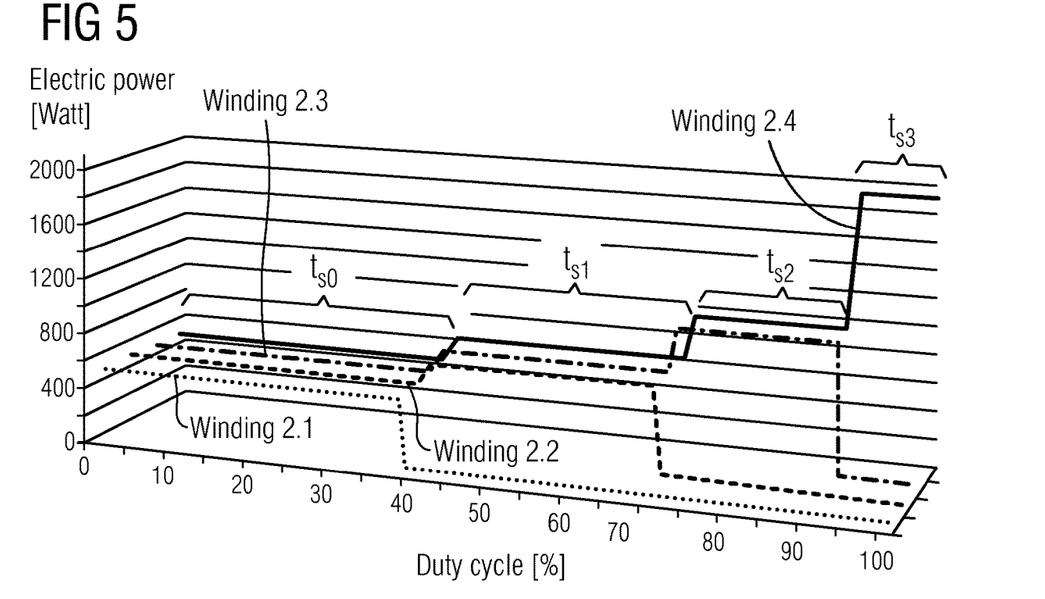
FIG. 5 shows the electric power provided to the respective windings in an operation cycle according to a second example power request.

FIG. 5 illustrates an example power distribution provided to a heating power transferring element 2 comprising for windings 2.1—2.4 over an operating cycle. In the shown example, four different power requests or rescaled power requests have been received, namely a power request of 200 W for winding 2.1, a power request of 400 W for winding 2.2, a power request of 600 W for winding 2.3 and a power request of 800 W for winding 2.4.

Based on formula 1, the number of time slots included in one operating cycle is $N_{Slots}=4$. According to formula 2, the total requested power is $Tot_{Pwr}=2000$ W.

So, in other words, the operating cycle shown in FIG. 5 comprises four time slots $t_{s0}$ to $t_{s4}$, wherein the total power of 2000 W has to be distributed over the windings 2.1-2.4 of the heating power transferring element 2 within the operating cycle.

According to formula 3, the power array $Sort_{Pwr}$ includes the following values: $Sort_{Pwr}=\{Pwr_{s0}, Pwr_{s1}, Pwr_{s2}, Pwr_{s3}\}=\{200, 400, 600, 800\}$.

The weight array W includes, according to formula 4, the values: $W=\{w_0, w_1, w_2, w_3\}=\{1,1,1,1\}$.

According to formula 5, $N_{ts0}=N_{Za}=4$. So, in other words, at the beginning, all windings 2.1-2.4 for which a power request has been received are powered.

According to formula 6, in the second time slot $t_{s1}$, the number of activated windings is reduced as follows:

$$N_{ts1}=N_{ts0}-W[0]=3;$$

So, in other words, in the second time slot $t_{s1}$, the number of activated windings is reduced from four to three (winding 2.1 is deactivated). It is worth mentioning that in the second time slot $t_{s1}$, those windings remain activated for which higher power requests have been received.

Similarly, in the following time slots $t_{s2}$, $t_{s3}$ also one winding is deactivated per each time slot.

$$N_{ts2}=N_{ts1}-W[1]=2;$$

$$N_{ts3}=N_{ts2}-W[1]=1;$$

Based on formulas 7 and 8, the average power provided to the cookware item in the respective time slot is calculated:

$$P_{ts0=Pwrs0} \cdot N_{ts0}=800 \text{ W};$$

$$P_{ts1}=(Pwr_{s1}-Pwr_{s0}) \cdot N_{ts1}=(400 \text{ W}-200 \text{ W}) \cdot N_{ts1}=200 \text{ W} \cdot 3=600 \text{ W};$$

$$P_{ts2}=(Pwr_{s2}-Pwr_{s1}) \cdot N_{ts2}=(600 \text{ W}-400 \text{ W}) \cdot N_{ts2}=200 \text{ W} \cdot 2=400 \text{ W};$$

$$P_{ts_3}=(\text{Pwr}_{s3}-\text{Pwr}_{s2})\cdot N_{ts_3}=(800\text{ W}-600\text{ W})\cdot N_{ts_3}=200\text{ W}\cdot 1=200\text{ W};$$

The length of the time slots $t_{s0}$ to $t_{s3}$ is calculated based on formula 9:

$$t_{s0\%} = \frac{P_{ts_0}}{Tot_{Pwr}} = \frac{800\text{ W}}{2000\text{ W}} = 0.4;$$

$$t_{s1\%} = \frac{P_{ts_1}}{Tot_{Pwr}} = \frac{600\text{ W}}{2000\text{ W}} = 0.3;$$

$$t_{s2\%} = \frac{P_{ts_2}}{Tot_{Pwr}} = \frac{400\text{ W}}{2000\text{ W}} = 0.2;$$

$$t_{s3\%} = \frac{P_{ts_3}}{Tot_{Pwr}} = \frac{200\text{ W}}{2000\text{ W}} = 0.1;$$

Thus, in the first time slot $t_{s0}$, all windings 2.1-2.4 are powered with 500 W, in the second time slot $t_{s1}$, windings 2.2-2.4 are powered with 660 W, whereas winding 2.1 has been deactivated.

In the third time slot $t_{s2}$, windings 2.3 and 2.4 are powered with 1000 W (windings 2.1 and 2.2 deactivated) and in the fourth time slot $t_{s3}$, only winding 2.4 is powered at 2000 W.

Figure 6:
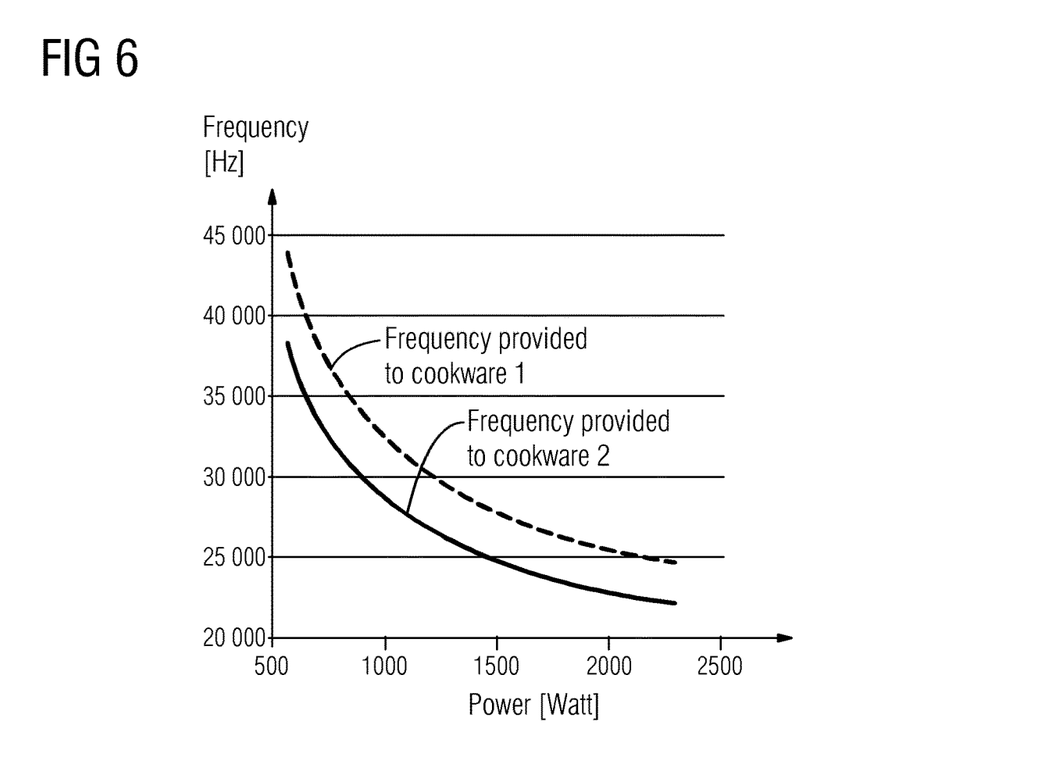
FIG. 6 shows the frequency dependency of consumed electric power of a certain winding for different cookware items.

FIG. 6 schematically illustrates the decrease of electric power consumed by a winding of a heating power transferring element 2 depending on different cookware items placed above said winding. The higher the frequency, the lower the power consumption of the winding.

In case of a bad coupling of a cookware item with a certain winding, for example because of a bad coverage of said winding, the electric power provided to said winding has to be reduced, which can be obtained by an increase of AC-frequency.

However, due to isofrequenciality, i.e. the target to power all windings with the same or essentially the same frequency in order to reduce acoustic noise, not only the partly covered winding but all windings have to be powered with a higher frequency, which leads to a decrease of power of all windings.

In order to avoid an excessive power decrease of the whole heating power transferring element 2 caused by a single, badly-covered winding, the electric power provided to the respective winding may be evaluated. The electric power value obtained by said evaluation may be compared with a power threshold value. If the evaluated power value is below said power threshold value, the badly-covered winding may be excluded, i.e. not powered despite having received a power request for said winding in order to avoid a power reduction of all windings.

According to a more sophisticated embodiment, the power consumed by the badly-covered winding may be compared with the power decrease of all other windings which may be negatively affected due to the badly-covered winding. More in detail, the power decrease of well-covered windings may be summed-up and said summation value may be compared with the power consumed by the badly-covered winding. If the summation value increases the power consumed by the badly-covered winding, it is advantageous to exclude/deactivate the badly-covered winding. Accordingly, it may be a more flexible possibility for excluding a winding.

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 cooking hob
2 heating power transferring element
2.1-2.$n$ winding
3.1-3.$n$ heating power energy unit
4 control unit
5 cookware item
6 line
7 user interface

The invention claimed is:
1. A cooking hob comprising:
   at least one induction coil including multiple concentrically arranged windings,
   one or more heating power generators for powering said windings of the induction coil,
   a storage including power scale information, and
   a controller configured to:
      control said one or more heating power generators,
      determine coverage of the windings of the induction coil by a cookware item,
      balance heat provided to the cookware item by determining a rescaled electric power for the windings of the induction coil based on power requests and information regarding the coverage of the windings, and
      establish an operating cycle by determining a duty cycle for one or more windings of the induction coil, said duty cycle defining an activation time of the respective winding,
   wherein the duty cycle is chosen such that a mean electric power provided to the respective winding within the operating cycle is equal or essentially equal to the rescaled electric power associated with said winding, and
   wherein said power scale information indicates a fraction of power provided to the respective winding depending on a certain operating scenario.
2. The cooking hob according to claim 1, wherein the operating scenario is associated with coverage information indicating the coverage of the windings of the induction coil.
3. The cooking hob according to claim 1, wherein the controller is configured to add the power requests associated with all windings of said induction coil in order to obtain total requested power and distribute said total requested power among the windings according to said power scale information.
4. The cooking hob according to claim 1, wherein the windings of the induction coil are powered by an AC current having the same or essentially the same frequency.
5. A cooking hob comprising:
   at least one induction coil including multiple concentrically arranged windings,
   one or more heating power generators for powering said windings of the induction coil, and
   a controller configured to:
      control said one or more heating power generators,
      determine coverage of the windings of the induction coil by a cookware item,
      balance heat provided to the cookware item by determining a rescaled electric power for the windings of the induction coil based on power requests and information regarding the coverage of the windings, and establish an operating cycle by determining a duty cycle for one or more windings of the induction coil, said duty cycle defining an activation time of the respective winding, wherein the duty cycle is chosen such that a mean electric power provided to the respective winding within the operating cycle is equal or essentially equal to the rescaled electric power associated with said winding, and wherein the controller is further configured to evaluate an inductive coupling between a cookware item and one or more windings of the induction coil.

6. The cooking hob according to claim 5, wherein the controller is further configured to establish information regarding power decrease caused by a poorly-coupled winding and to compare said information regarding the power decrease with a threshold value in order to exclude said poorly-coupled winding.

7. A method for controlling a cooking hob, the cooking hob comprising at least one induction coil comprising multiple concentrically arranged windings, one or more heating power generators powering said windings of the induction coil and a controller for controlling said one or more heating power generators, the method comprising the steps of:

determining coverage of the windings of the induction coil by a cookware item;

storing power scale information indicating a fraction of power provided to the respective winding depending on a certain operating scenario;

determining a rescaled electric power for the windings of the induction coil based on power requests and information regarding the coverage of the windings, thereby balancing heat provided by the windings to the cookware item;

establishing an operating cycle by determining a duty cycle for one or more windings of the induction coil, said duty cycle defining an activation time of the respective winding, wherein the duty cycle is chosen such that mean electric power provided to the respective winding within the operating cycle is equal or essentially equal to the rescaled electric power associated with said winding.

8. The method according to claim 7, wherein the windings of the induction coil are powered by an AC current having the same or essentially the same frequency.

9. The method according to claim 7, wherein the operating cycle is segmented in multiple time slots and a length of a first time slot of the operating cycle is determined such that the rescaled electric power associated with at least one said winding is obtained based on the electric power provided to said at least one winding in the first time slot multiplied by a quotient of durations of said first time slot and said operating cycle.

10. The method according to claim 7, wherein at a beginning of the operation cycle, a number of activated windings is greatest and then decreases in subsequent time slots.

11. The method according to claim 7, wherein a total electric power is established and said total electric power is distributed among the active windings.

12. The method according to claim 7, wherein windings with the same rescaled electric power are powered simultaneously and with a same duration in the operating cycle.

13. The method according to claim 7, wherein the operating cycle is segmented in multiple time slots, wherein a number of time slots included in one operating cycle corresponds to a number of different rescaled electric power values associated with said windings.

14. The method according to claim 7, wherein inductive coupling between the cookware item and at least one said winding is evaluated and the at least one said winding is deactivated if a power decrease caused by a poor coupling is above a certain threshold value.

* * * * *

UNITED STATES PATENT AND TRADEMARK OFFICE
CERTIFICATE OF CORRECTION

PATENT NO. : 11,277,888 B2
APPLICATION NO. : 17/256299
DATED : March 15, 2022
INVENTOR(S) : Massimo Nostro It is certified that error appears in the above-identified patent and that said Letters Patent is hereby corrected as shown below:

In the Specification

Column 14, Line 57: please remove the phrase "$N_{ts3}=N_{ts2}-W[1]=1$;" and replace it with -- $N_{ts3}=N_{ts2}-W[2]=1$; --

In the Claims

Column 17, Line 29: please remove the phrase "determining a resealed electric" and replace it with -- determining a rescaled electric --

Column 18, Line 3: please remove the phrase "the resealed electric power" and replace it with -- the rescaled electric power --

Column 18, Line 11: please remove the phrase "the resealed electric power" and replace it with -- the rescaled electric power --

Column 18, Line 29: please remove the phrase "the resealed electric power" and replace it with -- the rescaled electric power --

Column 18, Line 29: please remove the phrase "different resealed electric power" and replace it with -- different rescaled electric power --

Signed and Sealed this
Twenty-seventh Day of September, 2022

Katherine Kelly Vidal
*Director of the United States Patent and Trademark Office*